UNITED STATES PATENT OFFICE.

ALEXANDER CLASSEN, OF AACHEN, GERMANY.

PROCESS OF CONVERTING CELLULOSE INTO SUGAR.

SPECIFICATION forming part of Letters Patent No. 695,795, dated March 18, 1902.

Original application filed December 8, 1900, Serial No. 39,209. Divided and this application filed July 30, 1901. Serial No. 70,292. (No specimens.)

*To all whom it may concern:*

Be it known that I, ALEXANDER CLASSEN, a citizen of Germany, residing at Aachen, in the Empire of Germany, have invented certain new and useful Improvements in Processes of Converting Cellulose into Fermentable Sugar, (for which I have made application for patents in the following countries—viz., Germany, dated May 11, 1900, June 13, 1900, June 13, 1900, and June 18, 1900, and France, dated November 5, 1900,) of which the following is a specification.

My invention especially relates to the process described in the specification forming part of my application for patent Serial No. 39,209 and filed December 8, 1900, of which it is a division, and has for its object to modify the process referred to.

Instead of treating the cellulose with sulfurous acid and converting it by introducing chlorin or chlorin-yielding substances, I disaggregate the material to be treated by means of the last-mentioned substances and effect the conversion by such sulfur compounds that will produce sulfuric acid with the chlorin.

I carry out my process as follows: I heat the cellulose material with chlorin-water of one-half to one volume per cent. in a closed vessel to 120° to 145° and then introduce either sulfurous acid in a gaseous state or in solution or such sulfur compounds that will produce sulfuric acid with the chlorin. When using sulfurous acid the following reaction takes place:

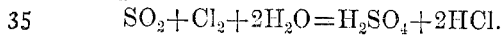

I may introduce either such quantity of sulfurous acid as will be sufficient to form 0.5 per cent. sulfuric acid or such quantity of it that it is in surplus after chemical reaction has taken place.

In some cases I have found it advantageous to cool the liquid to about 120° before introducing the sulfur compounds in order to obtain less colored and more easily fermentable solutions—for instance, when treating fir.

Having thus described the nature of my said invention and in what manner the same is to be performed, I claim—

1. The process for converting cellulose into sugar which consists in heating the cellulose in a closed vessel with chlorin to about 120° to 145° and then introducing compounds of sulfur that will produce sulfuric acid by the reaction with chlorin, substantially as described.

2. The process for converting cellulose into sugar which consists in heating the cellulose in a closed vessel with chlorin-yielding substances to about 120° to 145° and then introducing compounds of sulfur that will produce sulfuric acid by the reaction with chlorin, substantially as described.

In witness whereof I have hereunto set my hand in presence of two witnesses.

ALEXANDER CLASSEN.

Witnesses:
 E. M. BRUNDAGE,
 H. QUXDFLIEZ.